US011313335B2

(12) United States Patent
Santl

(10) Patent No.: US 11,313,335 B2
(45) Date of Patent: Apr. 26, 2022

(54) FIXING SLEEVE FOR FIRMLY FIXING A PLUG TO A SOCKET, AND INJECTOR ASSEMBLY

(71) Applicant: Bayerische Motoren Werke Aktiengesellschaft, Munich (DE)

(72) Inventor: Helmut Santl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/982,091

(22) PCT Filed: Apr. 26, 2019

(86) PCT No.: PCT/EP2019/060828
§ 371 (c)(1),
(2) Date: Sep. 18, 2020

(87) PCT Pub. No.: WO2019/228721
PCT Pub. Date: Dec. 5, 2019

(65) Prior Publication Data
US 2021/0108601 A1 Apr. 15, 2021

(30) Foreign Application Priority Data
May 28, 2018 (DE) .................... 10 2018 208 421.1

(51) Int. Cl.
*F02M 51/00* (2006.01)
*H01R 13/639* (2006.01)
(Continued)

(52) U.S. Cl.
CPC ......... *F02M 51/005* (2013.01); *H01R 13/639* (2013.01); *H01R 13/6392* (2013.01);
(Continued)

(58) Field of Classification Search
CPC ........... F02M 51/005; F02M 2037/082; H01R 13/639; H01R 13/6392; H01R 33/7621; H01R 33/7628; H02G 3/06
(Continued)

(56) References Cited

U.S. PATENT DOCUMENTS 5,338,211 A * 8/1994 Kodama ............. H01R 13/639
439/135
7,452,247 B1 11/2008 Rahman et al.
(Continued)

FOREIGN PATENT DOCUMENTS

CN 102280767 A 12/2011
CN 102403609 A 4/2012
(Continued)

OTHER PUBLICATIONS

International Search Report (PCT/ISA/210) issued in PCT Application No. PCT/EP2019/060828 dated Aug. 21, 2019 with English translation (four (4) pages).
(Continued)

*Primary Examiner* — Yi-Kai Wang
(74) *Attorney, Agent, or Firm* — Crowell & Moring LLP

(57) ABSTRACT

A fixing sleeve firmly fixes a plug to a socket. The fixing sleeve has two half-shells, which delimit a receiving space for receiving at least one part of the plug. A fastener is arranged adjacently to a plug-side end face of the fixing sleeve. An injector assembly includes an injector with a socket, a cable fastened to the plug, and the fixing sleeve.

14 Claims, 4 Drawing Sheets

(51) Int. Cl.
  *H02G 3/06* (2006.01)
  *H01R 33/76* (2006.01)
  *F02M 37/08* (2006.01)
(52) U.S. Cl.
  CPC ..... *H01R 33/7621* (2013.01); *H01R 33/7628* (2013.01); *H02G 3/06* (2013.01); *F02M 2037/082* (2013.01)
(58) Field of Classification Search
  USPC ........................................................ 123/445
  See application file for complete search history.

(56) References Cited

U.S. PATENT DOCUMENTS

| | | | |
|---|---|---|---|
| 10,014,633 B1 | 7/2018 | Choi et al. | |
| 2011/0120419 A1* | 5/2011 | Xu | F02M 51/005 123/470 |
| 2011/0256750 A1* | 10/2011 | Chen | H01R 13/6273 439/345 |
| 2015/0295344 A1* | 10/2015 | Sawada | H01R 13/5045 439/587 |
| 2020/0244002 A1 | 7/2020 | Refai | |

FOREIGN PATENT DOCUMENTS

| | | |
|---|---|---|
| DE | 42 37 895 C2 | 7/1997 |
| DE | 10 2017 216 353 A1 | 10/2018 |
| EP | 1 586126 B1 | 10/2006 |
| EP | 2 381 541 A1 | 10/2011 |
| WO | WO 2017/205935 A1 | 12/2017 |

OTHER PUBLICATIONS

German-language Written Opinion (PCT/ISA/237) issued in PCT Application No. PCT/EP2019/060828 dated Aug. 21, 2019 (six (6) pages).

German-language Search Report issued in German Application No. 10 2018 208 421.1 dated Mar. 29, 2019 with partial English translation (12 pages).

Chinese Office Action issued in Chinese Application No. 201980026607.8 dated Jun. 1, 2021, with English translation (Fifteen (15) pages).

* cited by examiner

FIXING SLEEVE FOR FIRMLY FIXING A PLUG TO A SOCKET, AND INJECTOR ASSEMBLY

BACKGROUND AND SUMMARY OF THE INVENTION

The present invention relates to a fixing sleeve for firmly fixing a plug to a socket, and to an injector assembly.

In internal combustion engines, vibrational loading occurs during driving. This vibrational loading also affects the contact connection of an injector by means of a plug, to which a cable of a vehicle wiring harness is fixed. In particular, the vibrational loading and a resulting movement of the plug relative to the injector create abrasion. The abrasion generates a deposit of dust particles on the plug contacts, which can lead to premature failure of the plug contacts. Over the service life, the deposit forms a high-impedance insulating layer, which then leads to electrical interruptions and, in the case of the injectors, to misfires.

It is therefore an object of the invention to provide a fixing sleeve and an injector assembly in which the loading of plugs, in particular vibrational loading, is reduced.

This object is achieved according to the invention by a fixing sleeve for firmly fixing a plug to a socket, wherein the fixing sleeve comprises two half-shells which delimit a receiving space for receiving at least one part of the plug. A fastener is arranged adjacently to a plug-side end face of the fixing sleeve. In this context, the term "plug-side" relates to a side of the fixing sleeve at which a plug is received and which faces toward an injector when the fixing sleeve as provided is fixed to a plug. The term "cable-side" relates correspondingly to a side of the fixing sleeve into which a cable connected to the plug runs in the mounted state. The plug-side end and the cable-side end are for example opposite one another.

The use of a fixing sleeve of this type during the fastening of a plug to a socket makes it possible to reduce a relative movement, in particular in a longitudinal direction of the fixing sleeve, to a minimum. By virtue of the reduced freedom of movement, abrasion and wear of the components involved are also substantially prevented, as a result of which the service life is increased.

For this purpose, the fastener can interact with a counterpart fastener of the socket, in order to fix the fixing sleeve to the socket. The plug can therefore be fixed to the socket indirectly via the fixing sleeve.

In particular, the fixing sleeve is a part that is separate from the plug and the cable.

The fixing sleeve is suitable, for example, for fixing a plug to an injector of an internal combustion engine. The present invention is, however, not restricted to the field of internal combustion engines. The fixing sleeve can be used in any field in which vibrational loading of plug-socket connections occurs.

The receiving space of the fixing sleeve is preferably of approximately cylindrical form. As a result, the geometry of the fixing sleeve can be adapted to the round cross section of the cable.

According to one embodiment, the fastener is in the form of a projection which protrudes radially outward from one of the half-shells. This projection can engage into a correspondingly formed receptacle on the socket and as a result fix the fixing sleeve to the socket. Such a projection can be easily and cost-effectively implemented in terms of production.

The receptacle can be realized, for example, on a latching arm of the socket.

As an alternative, the fixing sleeve can have a receptacle and the socket can have a correspondingly formed projection which can engage into the receptacle on the fixing sleeve.

In order to prevent the projection from detaching undesirably out of the engagement with the receptacle, for example as a result of vibrations that occur during driving, the receptacle, seen in a fixing direction, is in the form of an undercut. The fixing direction runs in a longitudinal direction of the fixing sleeve in a mounted state of the fixing sleeve.

The projection extends preferably in the longitudinal direction of the fixing sleeve beyond the face side. As a result, a tolerance compensation in the longitudinal direction of the fixing sleeve can be provided. In particular, it is possible to prevent a face side of the fixing sleeve from bearing against the socket before the fastener is in engagement with the counterpart fastener of the socket. Moreover, the projection can assume the function of a spacer in addition to its fixing function. It is specifically advantageous when the contact surface between the fixing sleeve and the socket is as small as possible, in order to prevent abrasion during driving.

According to one embodiment, the projection can have a guide surface on its side that faces away from the half-shells and runs obliquely with respect to the longitudinal axis of the fixing sleeve, wherein the guide surface is inclined radially inward in the direction of the socket. As a result, the insertion of the projection into the receptacle of a socket can be simplified. In particular, the projection is of a wedge-shaped configuration and tapers toward the socket or away from the half-shells.

In order also to be able to better fix the cable that is connected to the plug, provided on a face-side end of the fixing sleeve, in particular the cable-side end face, is an elongate extension which extends away from the fixing sleeve from one of the half-shells in the longitudinal direction, in particular wherein the extension has at least one notch. The cable can be fixed on the extension by means of a cable tie in order to stabilize the cable on the plug, wherein the cable tie is preferably arranged in the notch. The cable tie can be reliably held on the extension by the notch. In particular, it is possible to prevent the cable tie from sliding down off the extension.

The two half-shells are connected to one another preferably via a hinge, in particular via a film hinge. As a result, the half-shells can be captively fixed to one another. Furthermore, owing to the provision of a hinge, the mounting of the fixing sleeve on a plug is particularly simple.

According to one embodiment, at least one closing element is provided in order to fix the half-shells to one another. The closing element is preferably formed as a single part with the fixing sleeve. The fastening of the fixing sleeve to a plug is particularly simple and fast as a result. The closing element comprises, for example, a latching element on one half-shell and a latching projection on the other half-shell, wherein, when the two half-shells are brought together for the purpose of fastening to a plug, the latching element engages behind the latching projection and thus fixes the half-shells to one another.

At least one of the half-shells, in particular both half-shells, preferably have on their inner wall a groove which is formed to receive a collar of the plug. An axial fixing of the plug in the longitudinal direction of the fixing sleeve is thus achieved in such a way that the plug does not have a movement clearance or has only a very small movement clearance in the sleeve. This contributes likewise to the prevention of abrasion and wear of the plug. The groove is in particular of a completely encircling form, as a result of which the fixing sleeve is mounted stably on the plug.

According to one embodiment, at least one of the half-shells, in particular both half-shells, have on their inner wall at least one rib which extends into the receiving space. A cable connected to the plug can be clamped in and thereby fixed in the fixing sleeve using the at least one rib or between two ribs, such that a movement of the cable with respect to the plug is substantially prevented.

In order to mount the fixing sleeve and thus also the plug in a defined position, a stop can be provided which bears against the socket in a mounted position. The projection preferably constitutes the stop.

The fixing sleeve is for example of a single piece and/or is an injection molded component. As a result, the fixing sleeve can be produced simply and cost-effectively.

The object is furthermore achieved according to the invention by an injector assembly with an injector with a socket, a plug, a cable fastened to the plug, and a fixing sleeve which is formed as described above, wherein one part of the plug is plugged into the socket and another part of the plug is arranged at least in the receiving space of the fixing sleeve.

The fixing sleeve fixes the plug to the socket of the injector in such a way that a relative movement between the plug and the injector during driving is prevented. In this way, wear of the injector assembly is minimized, with the result that the injector assembly has a long service life.

According to one embodiment, the socket has a counterpart fastener, in particular a latching arm, which is formed to engage behind the projection of the fixing sleeve. In this way, the fixing sleeve can latch on the injector, with the result that a relative movement between the fixing sleeve and the injector and thus also between the plug and the injector is substantially prevented. As a result, the vibrational loading which acts on the plug is small. In particular, a movement in a longitudinal direction of the fixing sleeve during driving is reduced.

Further advantages and features of the invention will become apparent from the following description and from the following drawings, to which reference is made.

DETAILED DESCRIPTION OF THE DRAWINGS

Figure 1:
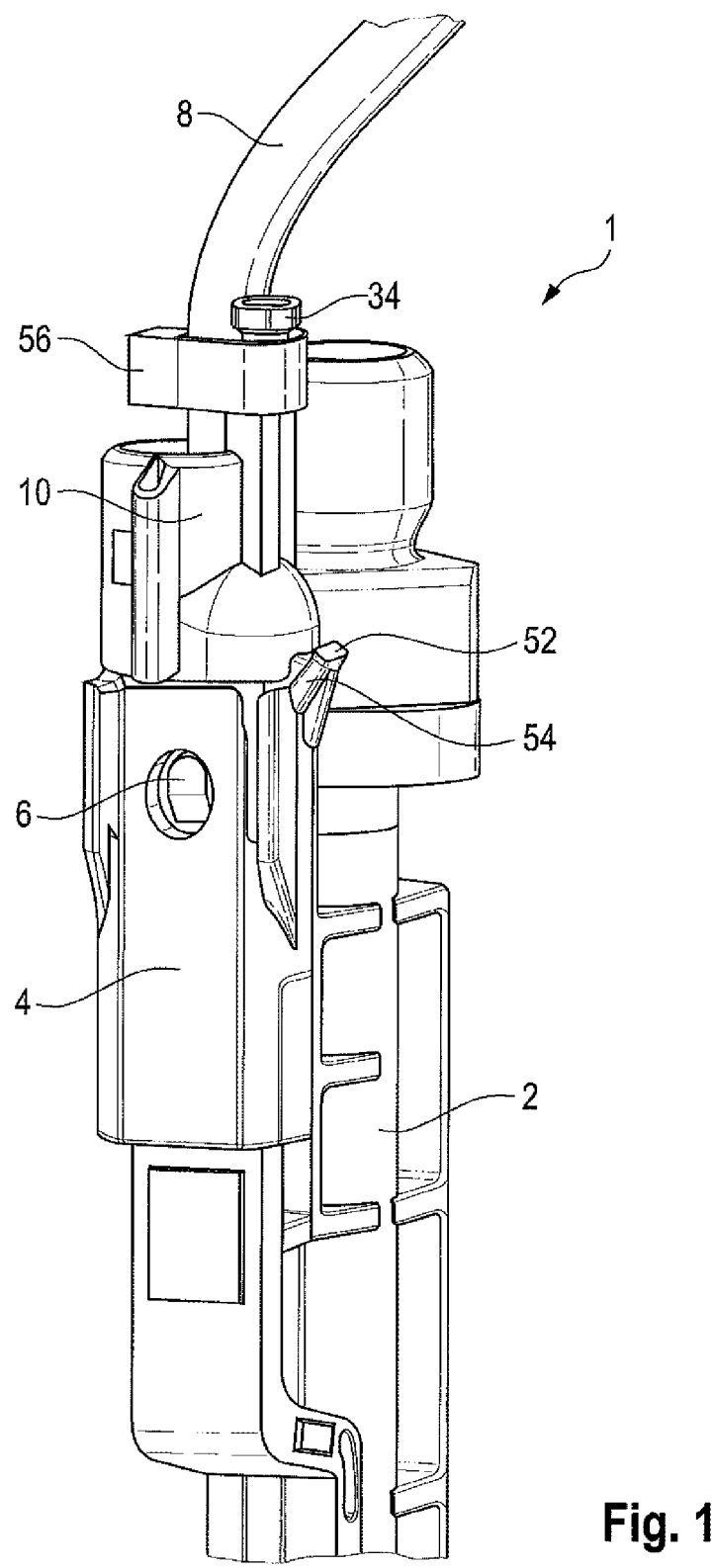
FIG. 1 shows an injector assembly according to an embodiment of the invention.

FIG. 1 shows an injector assembly 1 with an injector 2 with a socket 4, a plug 6, a cable 8 fastened to the plug 6, and a fixing sleeve 10.

One part of the plug 6 is plugged into the socket 4 for the purpose of making electrical contact with the injector 2, and another part of the plug 6 is arranged in a receiving space 11 of the fixing sleeve 10; the plug 6 in FIG. 1 is therefore mostly concealed.

Figure 2:
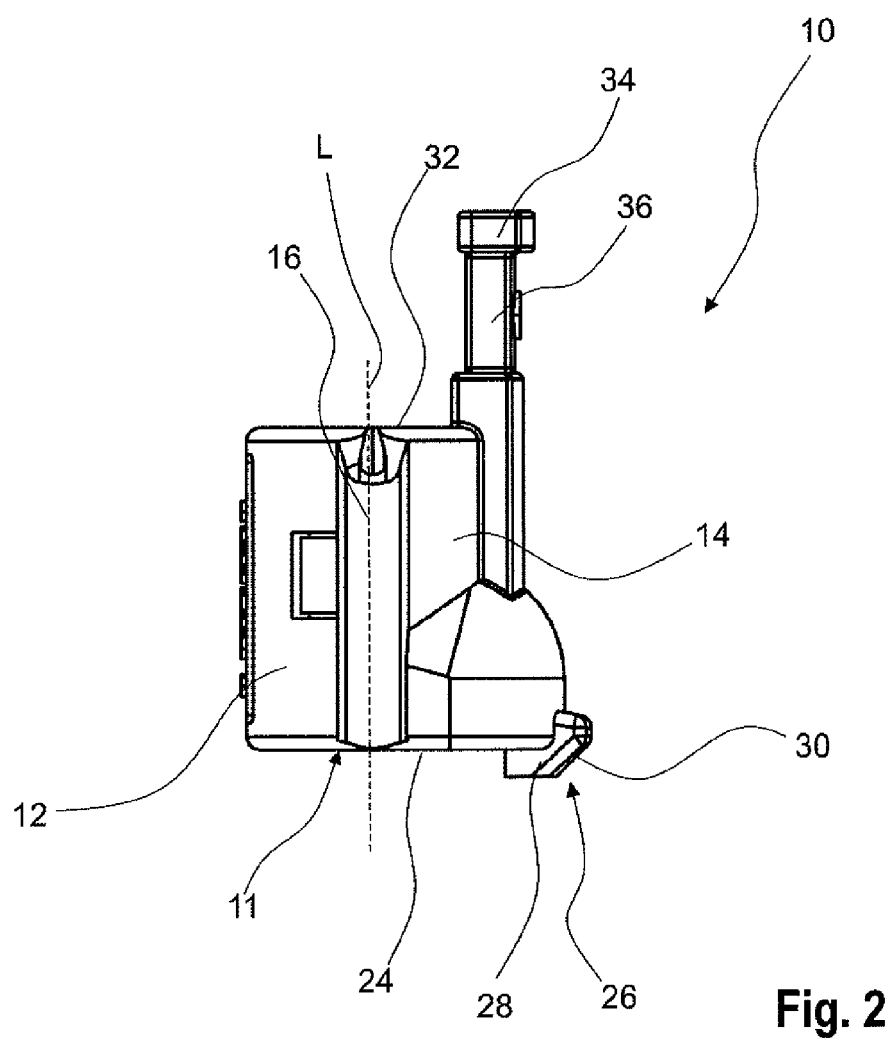
FIG. 2 shows a fixing sleeve according to the injector assembly of FIG. 1 in a closed state.
Figure 3:
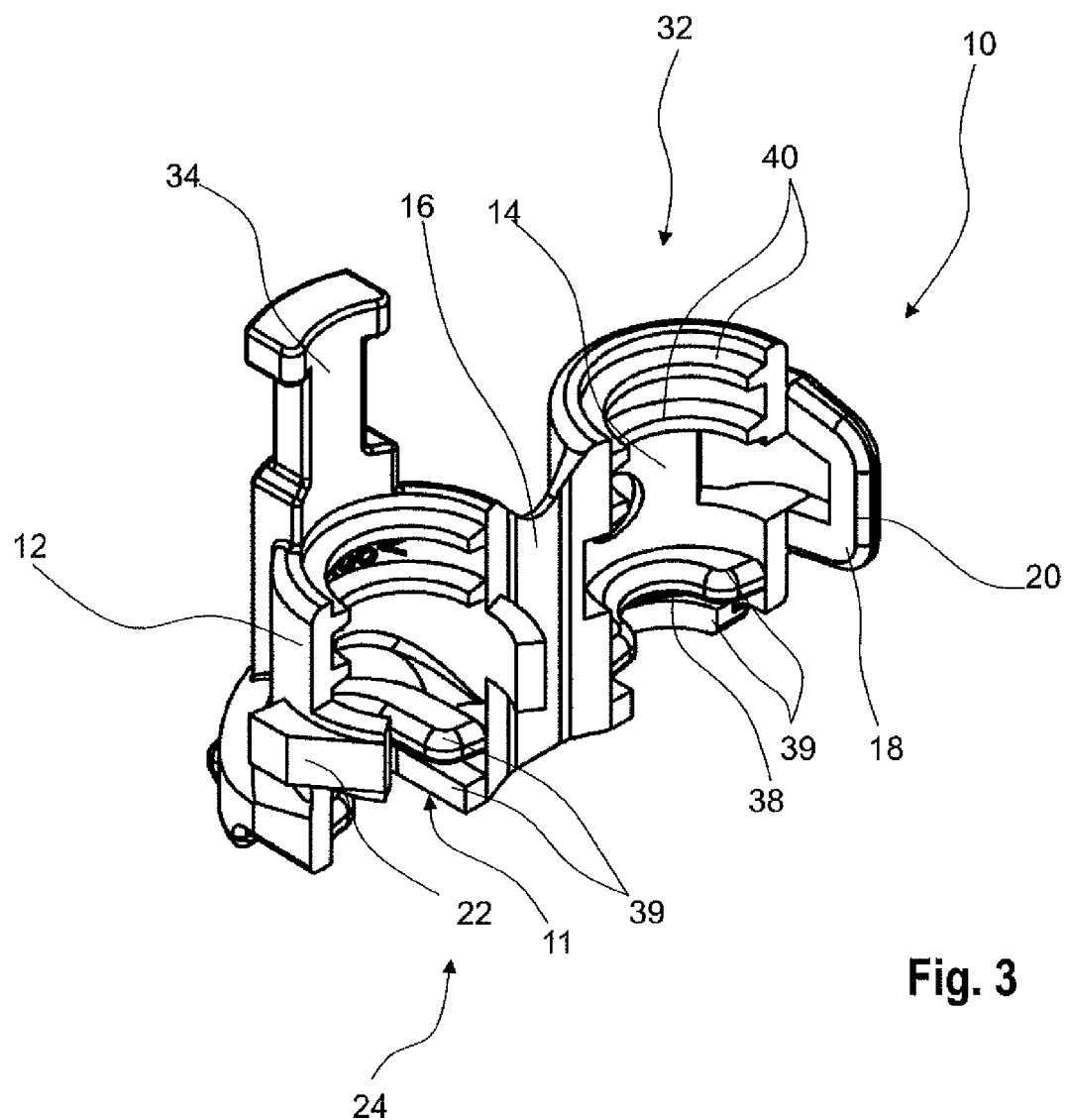
FIG. 3 shows the fixing sleeve from FIG. 2 in a swung-open state.

FIG. 2 shows the fixing sleeve 10 for firmly fixing the plug 6 to the socket 4 in a side view in the swung-closed state, while FIG. 3 shows the fixing sleeve 10 in a swung-open state in an isometric view.

The fixing sleeve 10 is, for example, an injection molded part which is formed as a single part.

The fixing sleeve 10 comprises two half-shells 12, 14 which delimit the receiving space 11 for receiving at least one part of a plug 6.

The half-shells 12, 14 are captively connected to one another via a hinge 16, in particular via a film hinge. The fixing sleeve 10 can thus be mounted particularly simply on the plug 6 by virtue of the fixing sleeve 10 being positioned and swung closed on the plug 6.

In addition, the fixing sleeve 10 has a closing element 18, in order to fix the half-shells 12, 14 to one another. As can be seen in FIG. 3, the closing element 18 comprises a latching element 20 and a latching projection 22, wherein the latching element 20 is provided on one of the half-shells 12 and the latching projection 22 is provided on the other half-shell 14.

The latching element 20 and the latching projection 22 are provided at those ends of the half-shells 12, 14 on which the hinge 16 does not engage.

The latching element 20 is for example a bracket which engages behind the latching projection 22 and thus closes the fixing sleeve 10.

A fastener 26 is arranged such that it adjoins a plug-side end face 24 of the fixing sleeve 10.

The fastener 26 is a projection 28 which protrudes radially outward from one of the half-shells 12, 14, in the exemplary embodiment shown from the half-shell 14. The projection 28 here extends in the longitudinal direction of the fixing sleeve 10 beyond the plug-side end face 24.

The projection 28 has a guide surface 30 on its side that faces away from the half-shells 12, 14 and runs obliquely with respect to the longitudinal axis L of the fixing sleeve 10, wherein the guide surface 30 is inclined radially inward in the direction of the socket 4.

The projection 28 can moreover be in the form of a wedge and tapers away from the half-shells 12, 14.

Provided at an opposite end face of the fixing sleeve 10, that is to say here the cable-side end face 32, is an elongate extension 34 which extends away from the fixing sleeve 10 from one of the half-shells 12, 14 in the longitudinal direction L.

The extension 34 has a notch 36 which serves for fixing a cable tie 56.

The half-shells 12, 14 have on their inner wall a groove 38 in each case, which can be seen in FIG. 3. In the exemplary embodiment shown, the groove 38 is formed between two radially inwardly protruding portions 39 of the inner wall.

The groove 38 runs completely around the respective inner wall. The groove 38 thus completely encircles the receiving space 11 in the closed state of the fixing sleeve 10.

Furthermore, the two half-shells 12, 14 have on their inner wall ribs 40 which extend into the receiving space 11. The ribs 40 of the two half-shells 12, 14 are formed at the same level with respect to the longitudinal axis L such that the diameter of the receiving space 11 is reduced in the region of two ribs 40. As a result, the cable 8 can be clamped in between the ribs 40.

Figure 4:
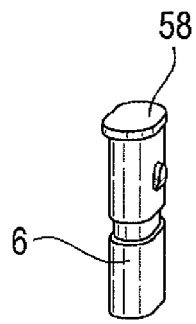
FIG. 4 shows the plug of the assembly according to FIG. 1.

FIG. 4 shows the plug 6 separately. The plug 6 has on its upper, cable-side end an encircling collar 58 which serves to position and fix the fixing sleeve 10 on the plug 6.

For the purpose of fixing, the collar 58 is arranged in the groove 38 of the fixing sleeve 10, and the fixing sleeve 10 is closed. The result is that the plug 6, seen in the longitudinal direction, is fixed.

Figure 5:
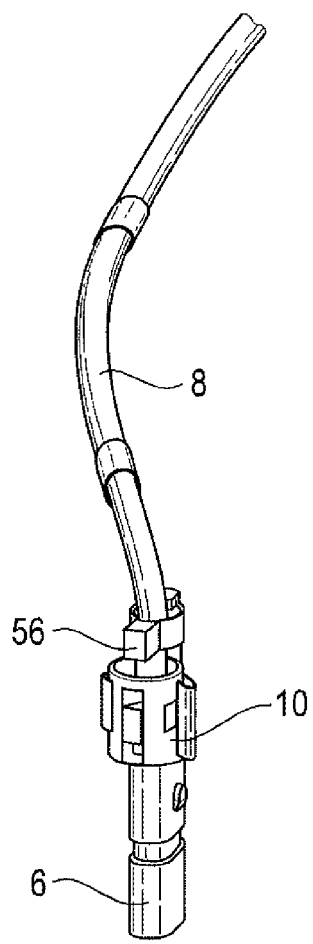
FIG. 5 shows the plug with a fixing sleeve, fastened to the plug, of the assembly according to FIG. 1.

The plug 6 provided with the fixing sleeve 10 is illustrated together with the cable 8 in FIG. 5. Here, the cable 8, running out of the fixing sleeve 10, of the plug 6 is fixed, in particular substantially immovably fixed, to the extension 34 by the cable tie 56.

The cable tie 56 is fastened at the level of the notch 36 or in the notch 36, as a result of which the cable tie 56 is prevented from sliding down off the extension 34.

The plug 6 together with the fixing sleeve 10 can then be inserted into the socket 4 of the injector 2 in order to achieve the mounted state, which is illustrated in FIG. 1.

The socket 4 has a counterpart fastener 52 for the purpose of fastening to the fixing sleeve 10.

The fastener 26 of the fixing sleeve 10 is formed to engage into the counterpart fastener 52 on the socket 4.

In the exemplary embodiment shown, the counterpart fastener 52 is a latching arm 54 which is formed to engage behind the projection 28 of the fixing sleeve 10.

For this purpose, provided in the latching arm 54 is a recess which corresponds substantially to the form of the projection 28 of the fixing sleeve 10. The latching arm 54 thus forms a latching hook.

The latching arm 54 extends out from the plug-side end of the injector 2 and is formed as a single part with the injector 2. This latching arm thus serves as an extension of the injector 2 in the direction of the plug 6.

In the mounted state, the projection 28 and the recess of the latching arm 54, seen axially, lie at the same height and the projection 28 engages into the recess.

Here, the latching arm 54 can be of a slightly flexible form, in order to be able to deflect when the plug 6 is being inserted into the socket 4.

During insertion, the tip of the latching arm 54 is pressed radially outward by the guide surface 30 until the tip of the latching arm 54 can be moved beyond the projection 28.

After this, the projection 28 reaches the recess and the latching arm 54 springs back. As a result, seen in the longitudinal direction of the injector 2, the fixing sleeve 10 is fixed firmly to the injector 2. Since the plug 6 is firmly held in the fixing sleeve 10, the plug 6 is also firmly fixed relative to the injector 2.

In addition, the loading of the plug 6 during driving is further reduced by virtue of the fact that the cable 8 is fixed to the projection 34 of the fixing sleeve 10 by the cable tie 56.

What is claimed is:

1. A fixing sleeve for firmly fixing a plug to a socket, comprising:
   two half-shells which delimit a receiving space of the fixing device for receiving at least one part of the plug; and
   a fastener arranged adjacently to a plug-side end face of the fixing sleeve, wherein
   the fastener is a projection which protrudes radially outward from one of the two half-shells,
   an elongate extension is provided on an end face of the fixing sleeve, and
   the elongate extension extends away from the fixing sleeve from one of the two half-shells in the longitudinal direction.

2. The fixing sleeve according to claim 1, wherein the projection extends in a longitudinal direction of the fixing sleeve beyond the end face side.

3. The fixing sleeve according to claim 2, wherein the projection has a guide surface on a side that faces away from the two half-shells and runs obliquely with respect to the longitudinal axis of the fixing sleeve, and the guide surface is inclined radially inward in a direction of the socket.

4. The fixing sleeve according to claim 1, wherein the elongate extension is on a cable-side end face opposite the plug-side end face, and
   the elongate extension includes a notch.

5. The fixing sleeve according to claim 1, wherein the two half-shells are connected to one another via a hinge.

6. The fixing sleeve according to claim 5, wherein the hinge is a film hinge.

7. The fixing sleeve according to claim 1, wherein at least one closing element is provided in order to fix the two half-shells to one another.

8. The fixing sleeve according to claim 1, wherein at least one of the two half-shells have on an inner wall a groove which is formed to receive a collar of the plug.

9. The fixing sleeve according to claim 8, wherein both of the two half-shells have on an inner wall a groove which is formed to receive a collar of the plug.

10. The fixing sleeve according to claim 1, wherein at least one of the two half-shells have on an inner wall at least one rib which extends into the receiving space.

11. The fixing sleeve according to claim 10, wherein both of the two half-shells have on an inner wall at least one rib which extends into the receiving space.

12. The fixing sleeve according to claim 1, wherein the fixing sleeve is a single piece and/or is an injection molded component.

13. An injector assembly, comprising:
   an injector with a socket;
   a plug;
   a cable fastened to the plug; and
   a fixing sleeve for firmly fixing the plug to the socket, the fixing sleeve comprising:
   two half-shells which delimit a receiving space of the fixing device for receiving at least one part of the plug; and
   a fastener arranged adjacently to a plug-side end face of the fixing sleeve, wherein one part of the plug is plugged into the socket and another part of the plug is arranged at least in the receiving space of the fixing sleeve, wherein
   the fastener is a projection which protrudes radially outward from one of the two half-shells,
   an elongate extension is provided on an end face of the fixing sleeve, and
   the elongate extension extends away from the fixing sleeve from one of the two half-shells in the longitudinal direction.

14. The injector assembly according to claim 13, wherein the socket has a counterpart fastener in a form of a latching arm, which is formed to engage behind the projection of the fixing sleeve.

* * * * *